(12) United States Patent
Chai et al.

(10) Patent No.: US 10,401,548 B2
(45) Date of Patent: Sep. 3, 2019

(54) INTEGRATED ANTENNA WITH DISPLAY UNIFORMITY

(71) Applicant: Intel Corporation, Santa Clara, CA (US)

(72) Inventors: Mei Chai, Portland, OR (US); Soji Sajuyigbe, Pittsburg, CA (US); Bryce D. Horine, Portland, OR (US); Tae Young Yang, Hillsboro, OR (US); Kwan Ho Lee, Mountain View, CA (US); Harry G. Skinner, Beaverton, OR (US); Anand S. Konanur, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 832 days.

(21) Appl. No.: 14/863,742

(22) Filed: Sep. 24, 2015

(65) Prior Publication Data

US 2017/0090098 A1 Mar. 30, 2017

(51) Int. Cl.
*F21V 8/00* (2006.01)
*H01Q 1/24* (2006.01)

(52) U.S. Cl.
CPC ......... *G02B 6/0041* (2013.01); *G02B 6/0055* (2013.01); *G02B 6/0073* (2013.01); *H01Q 1/243* (2013.01)

(58) Field of Classification Search
None
See application file for complete search history.

(56) References Cited

U.S. PATENT DOCUMENTS

| 6,312,971 | B1 | 11/2001 | Amundson et al. |
| 7,675,500 | B2 | 3/2010 | Daly |
| 7,847,753 | B2* | 12/2010 | Ishibashi ............... H01Q 1/243 343/702 |
| 7,983,721 | B2 | 7/2011 | Ying et al. |
| 8,634,764 | B2 | 1/2014 | Cruz et al. |
| 2006/0044286 | A1 | 3/2006 | Kohlhaas et al. |
| 2008/0080055 | A1 | 4/2008 | Lightfoot et al. |
| 2010/0172028 | A1 | 7/2010 | Kamei et al. |
| 2011/0273377 | A1 | 11/2011 | Merz |
| 2012/0019419 | A1* | 1/2012 | Prat ...................... H01Q 1/2266 343/702 |
| 2012/0218312 | A1 | 8/2012 | Goldsmith et al. |
| 2014/0106684 | A1 | 4/2014 | Burns et al. |
| 2014/0246664 | A1 | 9/2014 | Shoda |
| 2014/0327598 | A1* | 11/2014 | Zhu ...................... H01Q 9/0407 343/906 |
| 2014/0332773 | A1 | 11/2014 | Chien et al. |
| 2016/0328057 | A1* | 11/2016 | Chai ..................... G06F 3/0412 |

OTHER PUBLICATIONS

International Search Report dated Nov. 1, 2016 for PCT International Application No. PCT/US2016/048164.

* cited by examiner

*Primary Examiner* — Ashok Patel
(74) *Attorney, Agent, or Firm* — Schiff Hardin LLP

(57) ABSTRACT

A display having an integrated antenna with a substantially uniform transparency and/or light across the display. The display may have a uniformity layer that is an optical balance of the antenna, wherein the uniformity layer and the antenna have respective optical transparencies that provide a substantially uniform transparency across the display. The display may also have a backlight that has a surface brightness intensity corresponding to an optical inverse of the antenna, and is configured to provide a substantially uniform light across the display.

15 Claims, 7 Drawing Sheets

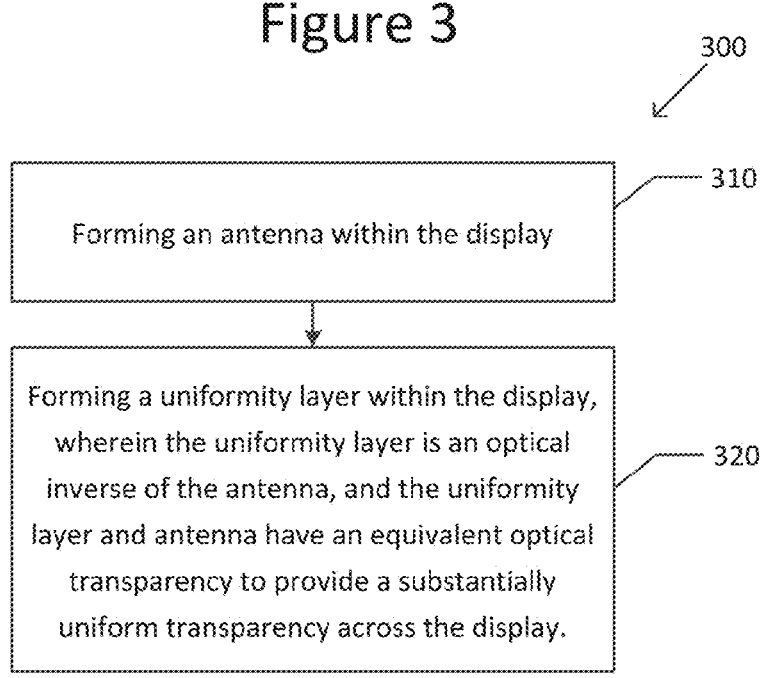
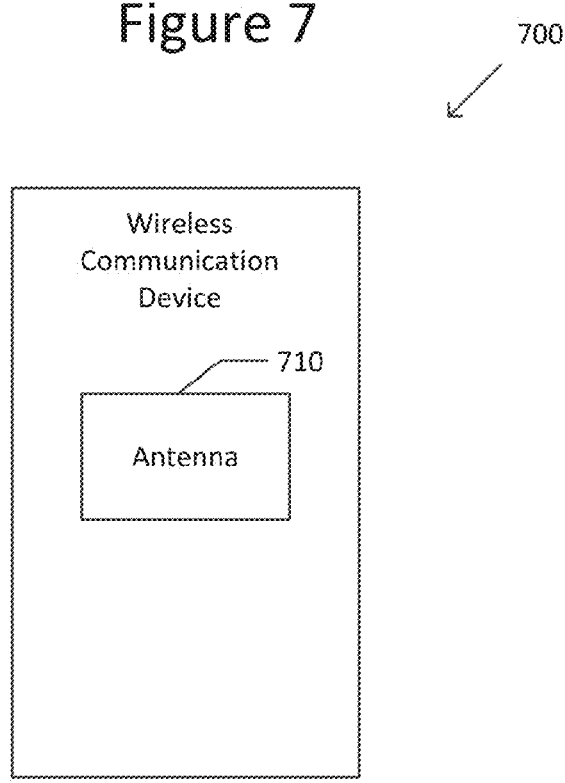

INTEGRATED ANTENNA WITH DISPLAY UNIFORMITY

TECHNICAL FIELD

The present disclosure generally relates to a display having an integrated antenna, and more specifically, to a display having an integrated antenna with a substantially uniform transparency and/or equalized light across the display.

BACKGROUND

Wireless communication devices, such as mobile phones and tablets, ideally have an edge-to-edge bezel-less display. At the same time the number of wireless communication protocols (e.g., Wi-Fi, 3G/4G/LTE, NFC, GPS, FM, etc.) that need to be supported and the related antennas are increasing.

Optically-transparent wire antennas can solve antenna footprint, radiation efficiency, and communication challenges. However, because the antenna material has a different optical transparency than the surrounding display material, an observer may notice visual effects, such as reduced transparency directly above the antenna region. This is especially noticeable at the antenna edges.

BRIEF DESCRIPTION OF THE DRAWINGS

FIG. 3 illustrates a flowchart of a method of forming the display of FIGS. 1A-1C and 2A-2D in accordance with an aspect of the disclosure.

FIG. 7 illustrates a schematic diagram of a wireless communication device in accordance with an aspect of the disclosure.

DESCRIPTION OF THE EXEMPLARY ASPECTS

The present disclosure is directed to a display having an integrated antenna with a substantially uniform transparency and/or light across the display in order to balance the uniformity for the integrated antenna. The display may have a uniformity layer that is an optical balance of the antenna, wherein the uniformity layer and the antenna have respective optical transparencies that provide a substantially uniform transparency across the display surface. Also, the display may have a backlight that has a surface brightness intensity corresponding to an optical balance of the antenna, and is configured to provide equalized light across the display surface.

By way of overview, FIGS. 1A-1C, 2A-2D, and 3 are directed to enabling display uniformity in the presence of a transparent, integrated antenna using a balanced optical uniformity layer.

Figure 1A:
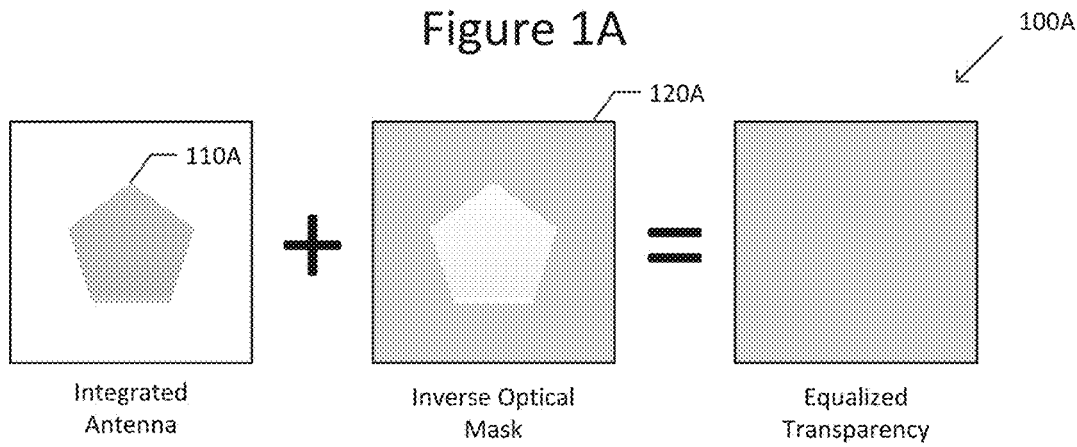
FIGS. 1A-1C illustrate top view diagrams of a display having an integrated antenna and an optical uniformity layer in accordance with aspects of the disclosure.

FIG. 1A illustrates a top view diagram of a display 100A in accordance with an aspect of the disclosure.

The display 100A comprises an integrated antenna 110A and a uniformity layer 120A. The uniformity layer 120A is an optical balance of the antenna 110A. The uniformity layer 120A and the antenna 110A have respective optical transparencies that when combined provide a substantially uniform transparency across the display 100A. As a result, transparency artifacts due to the conductive antenna material are removed.

Figure 1B:
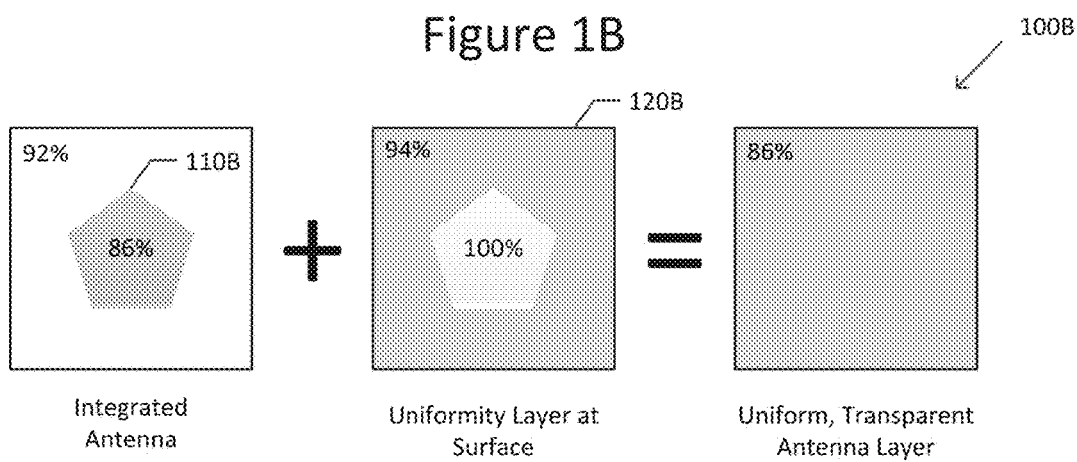

FIG. 1B illustrates a top view diagram of a display 100B in accordance with another aspect of the disclosure.

The display 100B comprises an integrated antenna 110B and a uniformity layer 120B. The uniformity layer 120B may be located at a surface of a nonconductive substrate material, such as Polyethylene Terephthalate (PET), surrounding the antenna area. The uniformity layer 120B is an optical balance layer of the antenna 110B. The transparency of the uniformity layer 120B is designed to equalize the transparency across the antenna layer and remove transparency uniformity defects due to the conductive antenna material.

In the example shown in this figure, the antenna 110B has an optical transparency of 86%, the non-antenna area (e.g., PET) has an optical transparency of 92%, and the uniformity layer 120B has an optical transparency of 94% in the non-antenna region. The antenna 110B optical transparency include PET. Once the antenna 110B and the uniformity layer 120B are combined, the display 100B equalizes the total transparency to 86% (i.e., 92%×94%=86%).

Figure 1C:
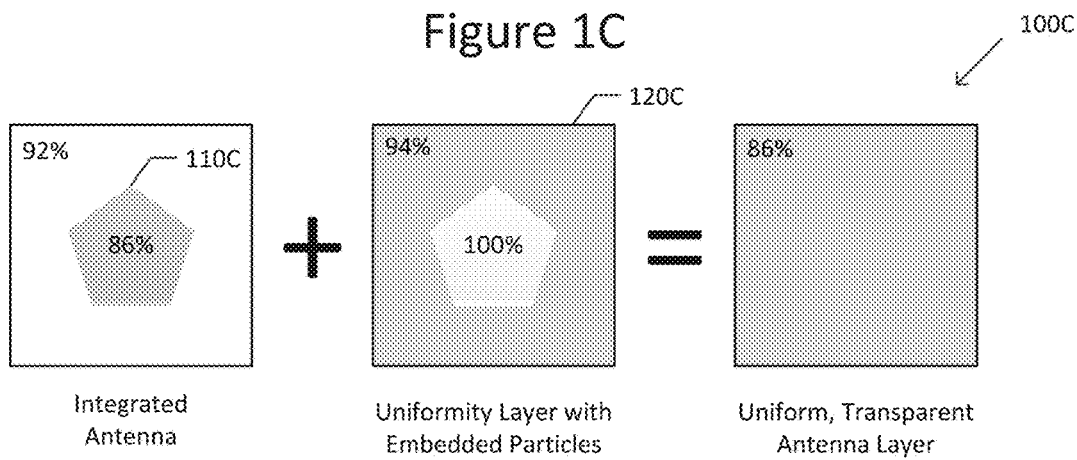

FIG. 1C illustrates a top view diagram of a display in accordance with another aspect of the disclosure.

The display 100C comprises an integrated antenna 110C and a uniformity layer 120C. The uniformity layer 120C is an optical balance layer of the antenna 110C. In the example shown in this figure, the antenna 110C has an optical transparency of 86%, the non-antenna area (e.g., PET) has an optical transparency of 92%, and the uniformity layer 120C has an optical transparency of 94% in the non-antenna region. The result is the display 100C has a substantially uniform transparency of 86% across the entire display surface, including both antenna and non-antenna regions.

The display 100C is similar to the display 100B of FIG. 1B, except that the uniformity layer 120C, rather than being simply a non-conductive substrate, may be infused with particles. The particles may be, for example, beads or mesh. Also, the particles may be non-conductive, or alternatively, conductive, such as Indium Titanium Oxide (IOT), Transparent Conductive Oxide (TCO), or silver. The particles do not impact the antenna performance, and balance the total transparency, especially at the antenna edges. Such a substrate may, to an extent, mimic the optical transparency properties of the transparent, integrated antenna.

Figure 2A:
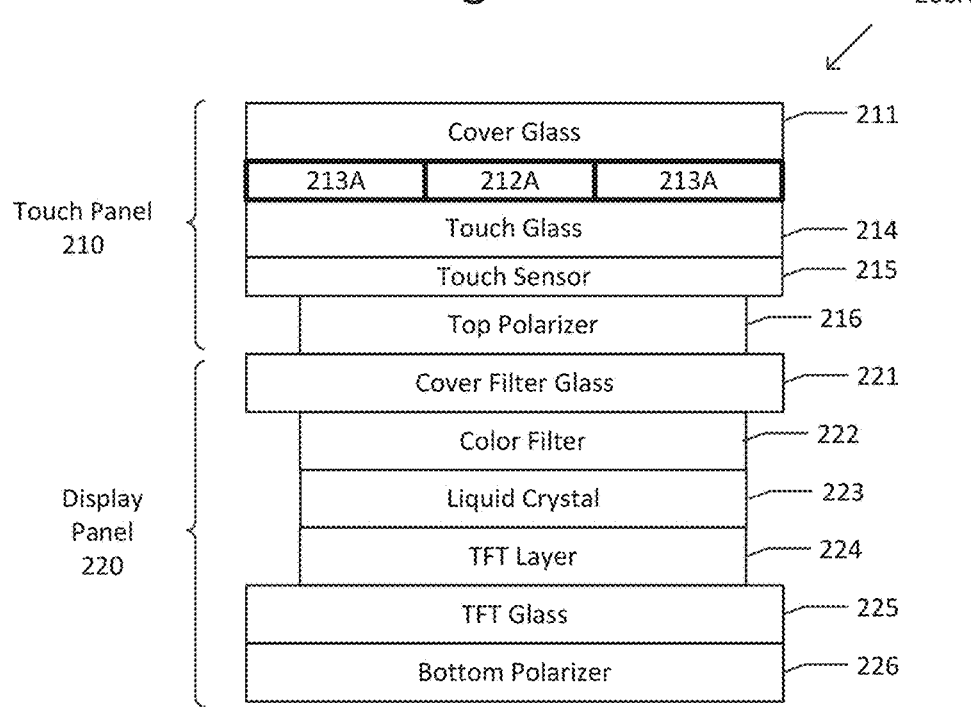
FIGS. 2A-2D illustrates schematic side view diagrams of stacks of components of a display in accordance with aspects of the disclosure.

FIG. 2A illustrates a schematic side view diagram of a stack of components of a display in accordance with an aspect of the disclosure. The components, in exaggerated dimension, comprise a stack of components of the display 200A such as a touch panel display for a mobile phone or tablet, though the disclosure is not limited in this respect. The display 200A comprises a touch panel 210 and a display panel 220.

The touch panel 210 comprises a cover glass 211, an integrated antenna 212A, a uniformity layer 213A, a touch glass 214, a touch sensor 215, and a top polarizer 216. The display panel 220, which is located under the touch panel 210, comprises a cover filter glass 221, a color filter 222, liquid crystal 223, a thin film transistor (TFT) layer 224, a TFT glass 225, and a bottom polarizer 226. These elements of the touch panel 210 and of the display panel 220 are known, and thus for the sake of brevity their individual descriptions will not be provided here.

The integrated antenna 212A and the uniformity layer 213A are located between the cover glass 211 and the touch glass 214. The integrated antenna 110 and uniformity layer 120 are as described above with respect to FIGS. 1A-1C.

Figure 2B:
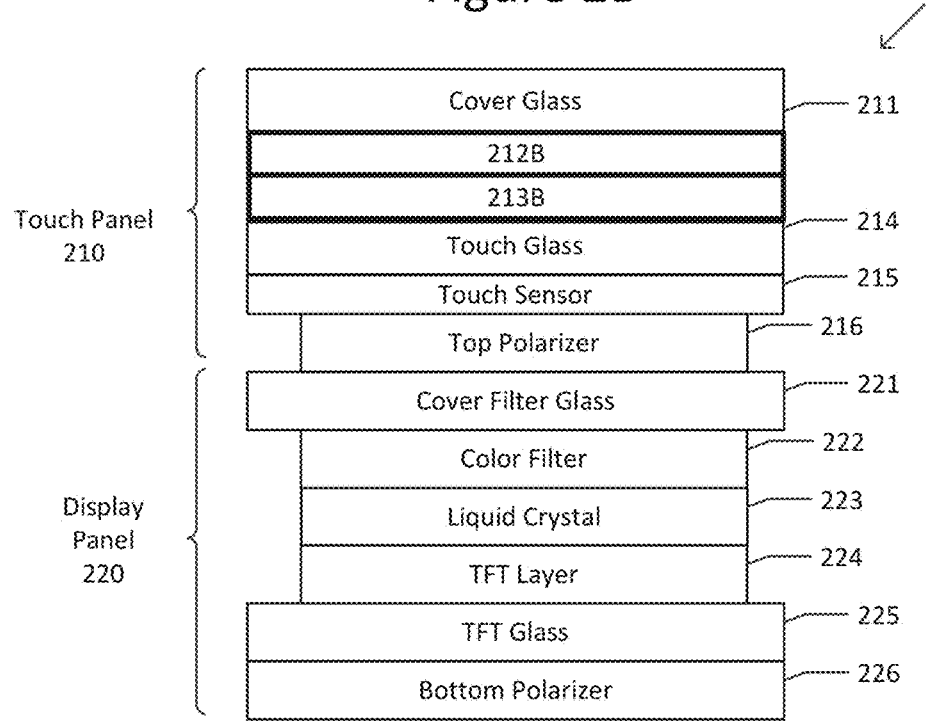

FIG. 2B illustrates a schematic side view diagram of a stack of components of a display 200B in accordance with another aspect of the disclosure. The display 200B is similar to the display 200A of FIG. 2A, except that the integrated antenna 212B and the uniformity layer 213B, rather than being located in a same layer, are located in separate layers. Usually the uniformity layer 213B is located under the antenna layer 212B, though the disclosure is not limited in this respect.

Figure 2C:
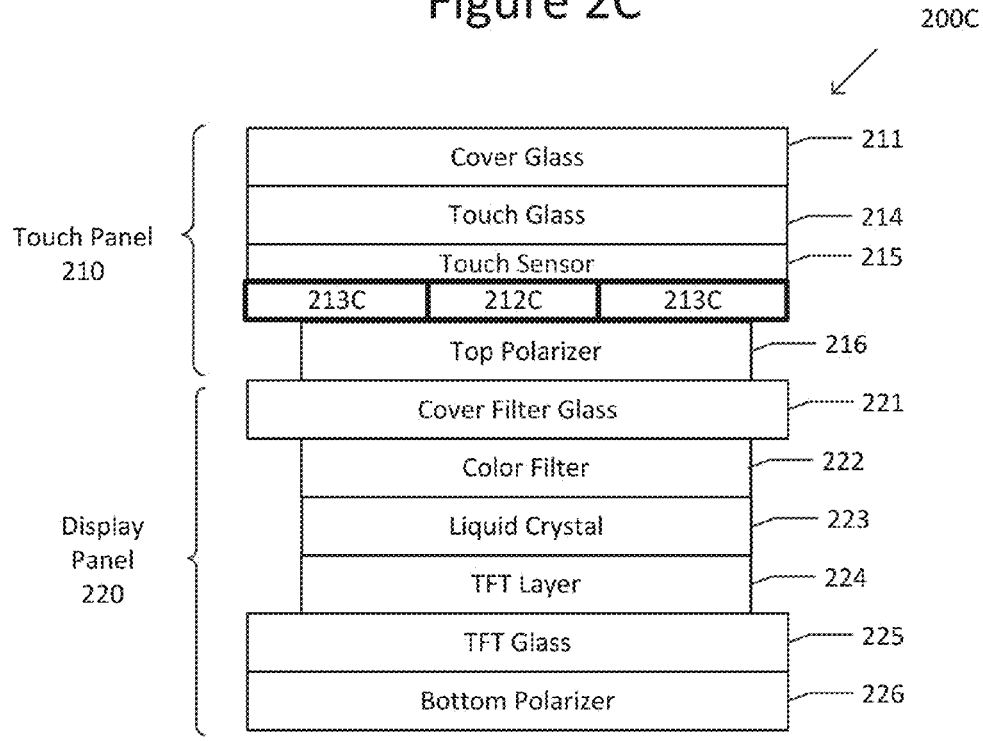

FIG. 2C illustrates a schematic side view diagram of a stack of components of a display 200C in accordance with another aspect of the disclosure. The display 200C is similar to the display 200A of FIG. 2A, except that the integrated antenna 212C and the uniformity layer 213C, rather than being located between the cover glass 211 and the touch glass 214, are located between the touch sensor 215 and the top polarizer 216.

Figure 2D:
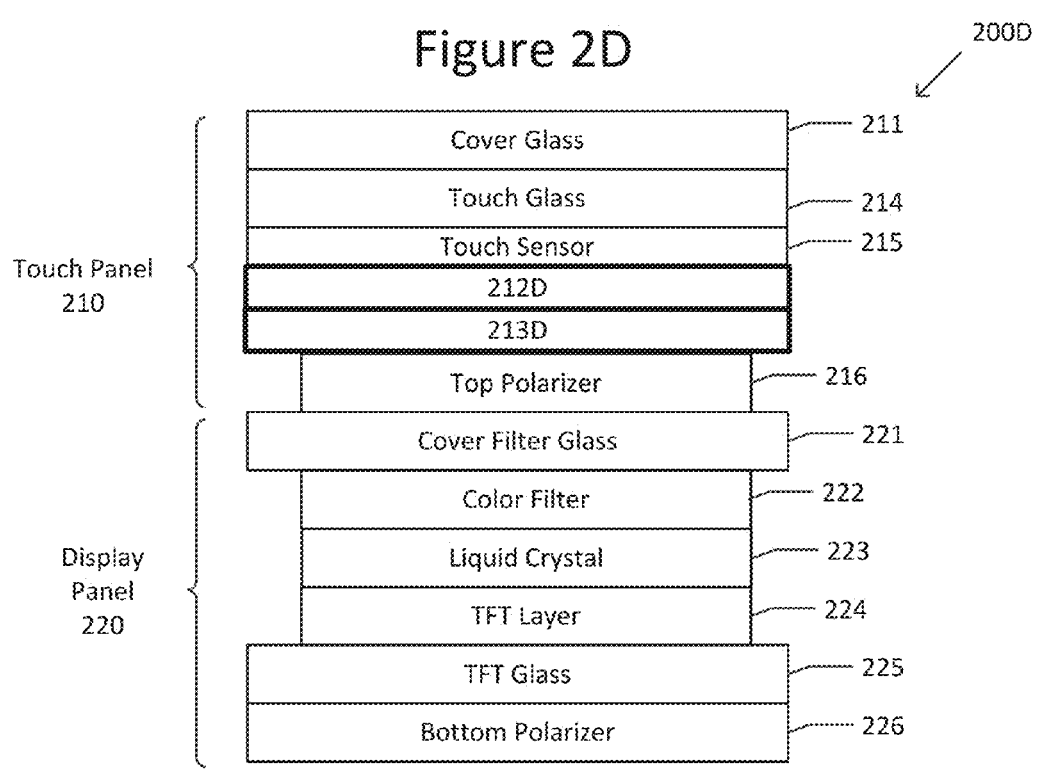

FIG. 2D illustrates a schematic side view diagram of a stack of components of a display 200D in accordance with another aspect of the disclosure. The display 200D is similar to the display 200C of FIG. 2C, except that the integrated antenna 212D and the uniformity layer 213D, rather than being located in a same layer, are located in separate layers. Usually the uniformity layer 213D is located under the antenna layer 212D, though the disclosure is not limited in this respect.

FIG. 3 illustrates a flowchart 300 of a method of forming a uniformity layer 120 for the displays 100, 200 of FIGS. 1A-1C and 2A-2D in accordance with an aspect of the disclosure.

At Step 310, an antenna 110 is formed within the display 100.

At Step 320, a uniformity layer 120 is formed within the display 100. Again, the uniformity layer 120 is an optical balance of the antenna 110, and the uniformity layer 120 and the antenna 110 have respective optical transparencies providing a substantially uniform transparency across the display 100.

The Step 320 of forming the uniformity layer 120 may comprise applying particles, which may be conductive or non-conductive, on the surface of a substrate, such as PET. Alternatively, the uniformity layer 120 may be formed with infused particles by heating the substrate slowly and uniformly until it is fully melted. Steady heat is maintained while mechanically introducing particles and mixing thoroughly but gradually. Steady heat is maintained across the melted substrate plastic in order to ensure that particles diffuse uniformly across the substrate volume. The substrate is then cooled slowly using an appropriate annealing process in order to maintain uniform distribution of particles as well as to maintain correct reformation of the substrate without deformation.

By way of overview, FIGS. 4A, 4B, 5A, 5B, 6A, and 6B are directed to backlight recalibration to equalize light across an antenna layer and removes transparency non-uniformity. The backlight may be made brighter behind the transparent, integrated antenna. Alternatively, the same outcome may be achieved by dimming the backlight in the region surrounding the antenna.

Figure 4A:
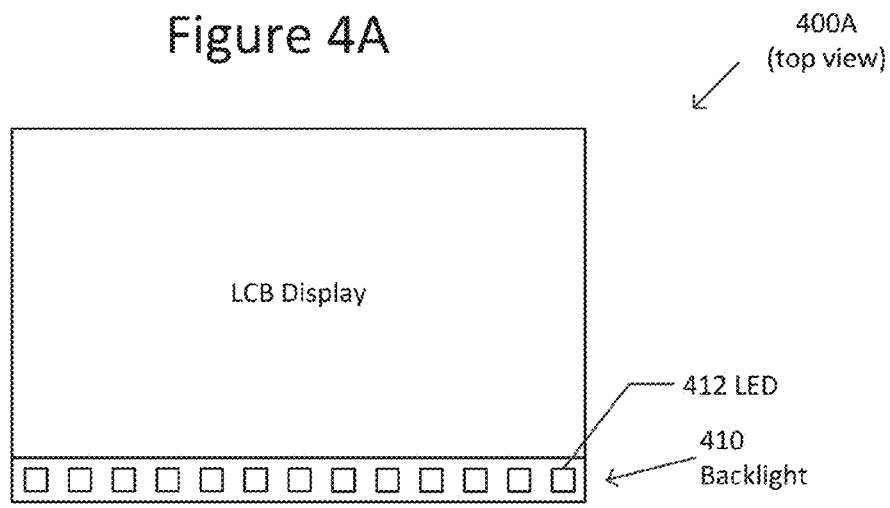
FIGS. 4A-4B illustrate schematic top and side view diagrams, respectively, of stacks of components of a display in accordance with an aspect of the disclosure.
Figure 4B:
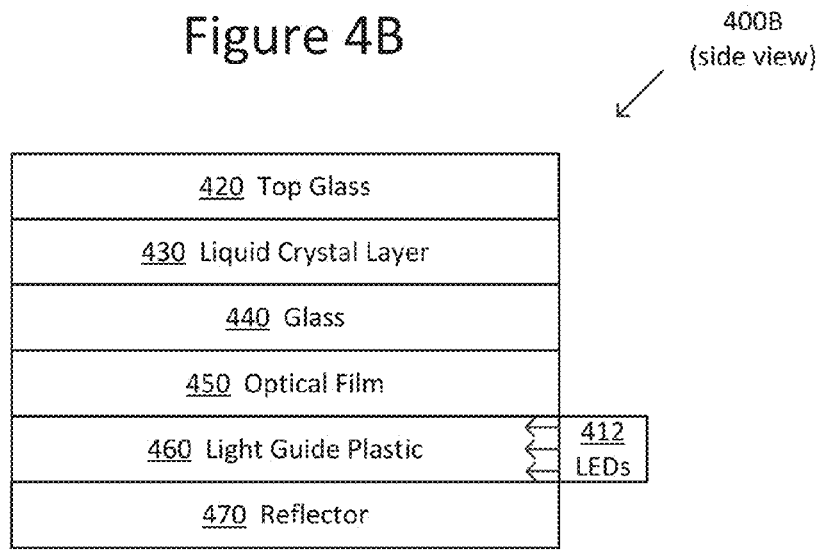

FIGS. 4A and 4B illustrate schematic top and side view diagrams, respectively, of a stack of components of a display 400 in accordance with an aspect of the disclosure.

FIG. 4A illustrates the display 400A comprising an integrated antenna (not shown) and a backlight 410. The backlight 410 comprises of an array of light emitting diodes (LEDs) 412 located in an area at a side of the display 400A.

The backlight 410 has a surface brightness intensity corresponding to an optical balance of the antenna, and is configured to provide a substantially uniform light across the display 400A. The backlight 410 is configured to have increased light emission intensity in a region located behind the antenna. Alternatively, the backlight 410 may be configured to have decreased light intensity in a region that is an optical balance of the antenna.

While FIG. 4A illustrates a single array of LEDs 412 located in an area at one side of the display 400A, an alternative approach is to add a second array of LEDs at a different location, such as at the opposing side. The two arrays may be used to obtain a more optimal brightness distribution over the display surface using a known beam synthesis approach in which light from the two arrays is combined. The disclosure is not limited to one array, or even two arrays of LEDs, but may include any number of arrays as suitable for the intended purpose.

FIG. 4B illustrates the display 400B, such as that for a television though the disclosure is not limited in this respect, in exaggerated dimension. The display 400B comprises a top glass 420, a liquid crystal layer 430, a glass 440, an optical film 450, a light guide plastic 460 fed by side-positioned LEDs 412, and a reflector 470. The reflector 470 is configured to reflect light to the light guide plastic 460, which then guides the light, to provide the substantially uniform light across the display 400A. These elements shown are generally known, and thus for the sake of brevity their individual descriptions will not be provided here.

Figure 5A:
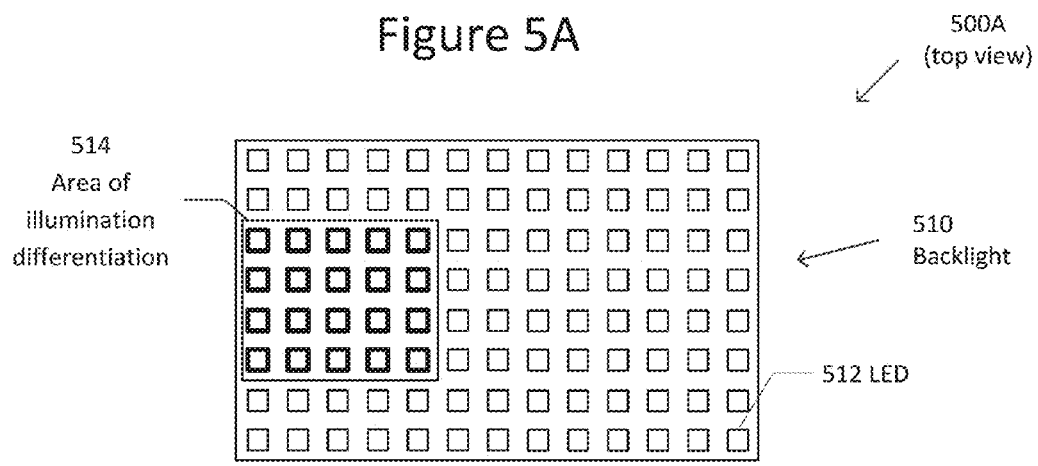
FIGS. 5A-5B illustrate schematic top and side view diagrams, respectively, of stacks of components of a display in accordance with an aspect of the disclosure.
Figure 5B:
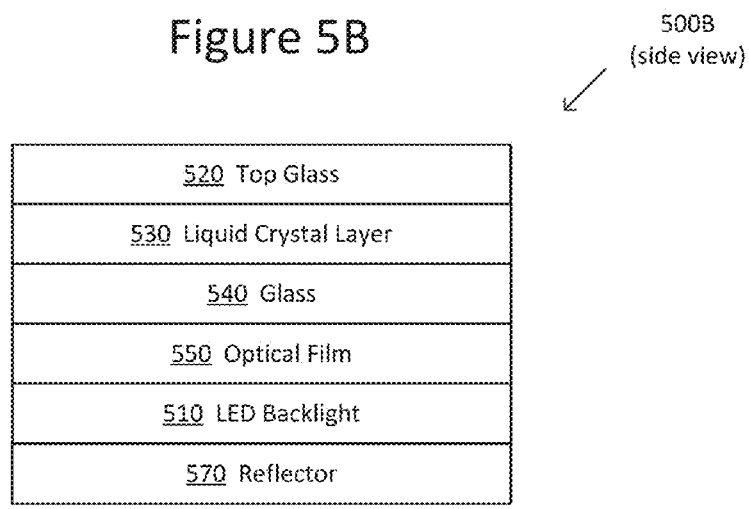

FIGS. 5A-5B illustrate schematic top and side view diagrams, respectively, of stacks of components of a display 500 in accordance with another aspect of the disclosure.

FIG. 5A illustrates the display 500A comprising an integrated antenna (not shown) and a backlight 510. The backlight 510 comprises of an array of light emitting diodes (LEDs) 512. The display 500A differs from the display 400A in that rather than the LEDs being located in an area at a side of the display 400A, the LEDs 512 are located over a substantial portion of the surface area of the display 500A. The area of illumination differentiation 514 is the array of the display 500A at which the antenna (not shown) is located. As mentioned above, this is the area where the backlight 510 may be made brighter a substantially uniform light across the display 500A. Alternatively, the same outcome may be achieved by dimming the backlight 510 in the region surrounding this area 514.

FIG. 5B illustrates the display 500B, such as that for a television, in exaggerated dimension. The display 500B comprises a top glass 520, a liquid crystal layer 530, a glass 540, an optical film 550, a backlight 510, and a reflector 570. In contrast to the display 400B of FIG. 4B, display 500B does not require a light guide plastic 460 and the side positioned LEDs 412. The elements of FIG. 5B are known, and thus for the sake of brevity their individual descriptions will not be provided here.

Figure 6A:
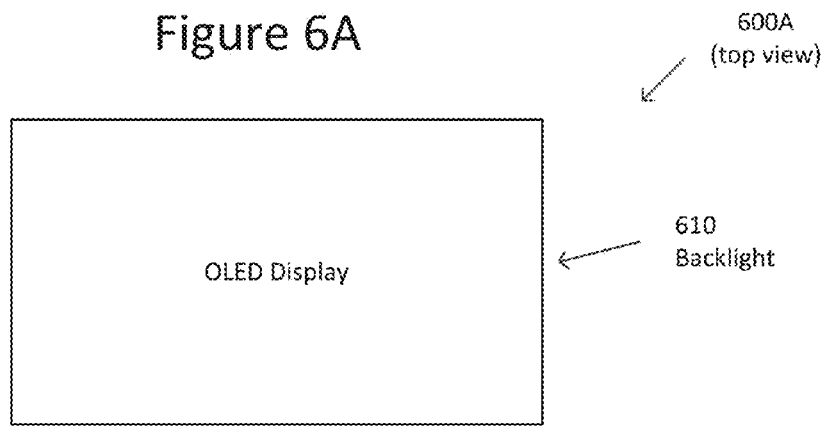
FIGS. 6A-6B illustrate schematic top and side view diagrams, respectively, of stacks of components of a display in accordance with an aspect of the disclosure.
Figure 6B:
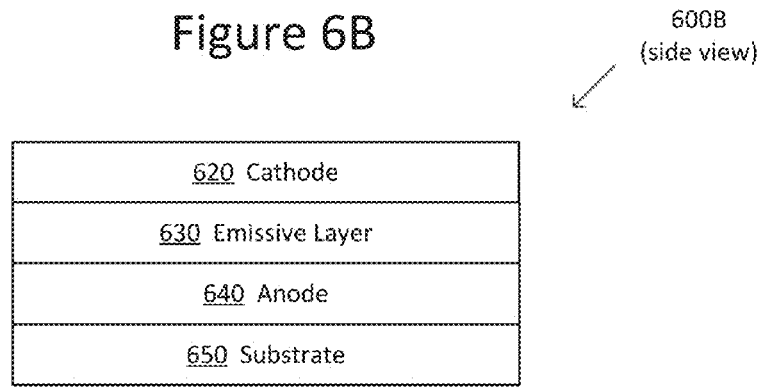

FIGS. 6A-6B illustrate schematic top and side view diagrams, respectively, of stacks of components of a display 600 in accordance with an aspect of the disclosure.

FIG. 6A illustrates the display 600A comprising an integrated antenna (not shown) and a backlight 610. The backlight 610 comprises of an array of organic light emitting diodes (OLEDs). The display 600A differs from the display 500A in that rather than there being LEDs, there are OLEDs. OLEDs do not require a separate light source, but instead have individual pixels emitting their own light as controlled by software.

FIG. 6B illustrates the display 600B, such as that for a television, in exaggerated dimension. The display 600B comprises a cathode 620, an emissive layer 630, an anode 640, and a substrate 650. These elements are known, and thus for the sake of brevity their individual descriptions will not be provided here.

FIG. 7 illustrates a schematic diagram of a wireless communication device 700 in accordance with an aspect of the disclosure.

The wireless communication device 700 comprises an integrated antenna 710 and a uniformity layer (not shown) and/or backlight (not shown), in accordance with any of the exemplary aspects described above.

Example 1 is a display, comprising: an integrated antenna; and a uniformity layer that is an optical balance of the antenna, wherein the uniformity layer and the antenna have respective optical transparencies that provide a substantially uniform transparency across the display.

Example 1 is a display, comprising: an integrated antenna; and a uniformity layer that is an optical balance of the integrated antenna, wherein the uniformity layer and the integrated antenna have respective optical transparencies providing a substantially uniform transparency across the display.

In Example 2, the subject matter of Example 1, wherein the uniformity layer is comprised of a nonconductive material.

In Example 3, the subject matter of Example 2, wherein the uniformity layer is comprised of Polyethylene Terephthalate (PET).

In Example 4, the subject matter of Example 1, wherein the uniformity layer is comprised of a conductive material.

In Example 5, the subject matter of Example 1, wherein the uniformity layer is comprised of a nonconductive substrate and dispersed particles.

In Example 6, the subject matter of Example 5, wherein the dispersed particles are beads.

In Example 7, the subject matter of Example 5, wherein the dispersed particles are a mesh.

In Example 8, the subject matter of Example 5, wherein the dispersed particles are metallic.

In Example 9, the subject matter of Example 5, wherein the dispersed particles are non-conductive.

In Example 10, the subject matter of Example 1, wherein the uniformity layer and the integrated antenna are located in a same layer of the display.

In Example 11, the subject matter of Example 1, wherein the uniformity layer and the integrated antenna are located in different layers of the display.

Example 12 is a wireless communication device comprising the display of the subject matter of Example 1.

Example 13 is a display, comprising: an integrated antenna; and a backlight having a surface brightness intensity corresponding to an optical balance of the integrated antenna, and the backlight being configured to provide a substantially uniform light across the display.

In Example 14, the subject matter of Example 13, wherein the backlight is configured to provide increased light emission intensity in a region located behind the integrated antenna.

In Example 15, the subject matter of Example 13, wherein the backlight is configured to provide decreased light intensity in a region that is an inverse of the integrated antenna.

In Example 16, the subject matter of Example 13, wherein the backlight is comprised of an array of light emitting diodes (LEDs).

In Example 17, the subject matter of Example 16, wherein the array of LEDs is located in a side of the display.

In Example 18, the subject matter of Example 16, wherein the array of LEDs is located over a substantial portion of the surface area of the display.

In Example 19, the subject matter of Example 16, wherein the LEDs are organic light emitting diodes (OLEDs).

In Example 20, the subject matter of Example 13, wherein the backlight comprises: a light guide plastic layer; light emitting diodes (LEDs) located on a side of the light guide plastic layer; and a reflector located under the light guide plastic.

Example 21 is a wireless communication device comprising the display of the subject matter of Example 20.

Example 22 is a method of forming a display, the method comprising: forming an antenna within the display; and forming a uniformity layer within the display, wherein the uniformity layer is an optical balance of the antenna, and the uniformity layer and the antenna have respective optical transparencies providing a substantially uniform transparency across the display.

In Example 23, the subject matter of Example 22, wherein the forming the uniformity layer comprises: heating a nonconductive substrate to a melting state; dispersing particles into the nonconductive substrate; and annealing the nonconductive substrate.

Example 24 is a display, comprising: an integrated antenna; and a uniformity means for providing an optical balance of the antenna, wherein the uniformity means and the integrated antenna have respective optical transparencies that provide a substantially uniform transparency across the display.

In Example 25, the subject matter of Example 24, wherein the uniformity means is comprised of Polyethylene Terephthalate (PET).

In Example 26, the subject matter of Example 24, wherein the uniformity means is comprised of a conductive material.

In Example 27, the subject matter of any of Examples 1-2, wherein the uniformity layer is comprised of Polyethylene Terephthalate (PET).

In Example 28, the subject matter of any of Examples 1-9, wherein the uniformity layer and antenna are located in a same layer of the display.

In Example 29, the subject matter of any of Examples 1-9, wherein the uniformity layer and antenna are located in different layers of the display.

Example 30 is a wireless communication device comprising the display of any of the Examples 1-11.

In Example 31, the subject matter of any of Examples 13-15, wherein the backlight is comprised of an array of light emitting diodes (LEDs).

Example 32 is a wireless communication device comprising the display of any of the Examples 13-20.

Example 33 is an apparatus substantially as shown and described.

Example 34 is a method substantially as shown and described.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A display, comprising:
    an integrated antenna; and
    a uniformity layer that is an optical balance of the integrated antenna,
    wherein the uniformity layer and the integrated antenna have at least portions thereof with different respective optical transparencies that, when combined, provide a substantially uniform transparency across the display.

2. The display of claim 1, wherein the uniformity layer is comprised of a nonconductive material.

3. The display of claim 2, wherein the uniformity layer is comprised of Polyethylene Terephthalate (PET).

4. The display of claim 1, wherein the uniformity layer is comprised of a conductive material.

5. The display of claim 1, wherein the uniformity layer is comprised of a nonconductive substrate and dispersed particles.

6. The display of claim 5, wherein the dispersed particles are beads.

7. The display of claim 5, wherein the dispersed particles are a mesh.

8. The display of claim 5, wherein the dispersed particles are metallic.

9. The display of claim 5, wherein the dispersed particles are non-conductive.

10. The display of claim 1, wherein the uniformity layer and the integrated antenna are located in a same layer of the display.

11. The display of claim 1, wherein the uniformity layer and the integrated antenna are located in different layers of the display.

12. A wireless communication device comprising the display of claim 1.

13. The display of claim 1, wherein the uniformity layer includes regions having different respective transparencies.

14. The display of claim 13, wherein the integrated antenna is disposed within an antenna layer that includes regions having different respective transparencies.

15. The display of claim 14, wherein the different respective transparencies of the uniformity layer equalize the different respective transparencies across the antenna layer thereby producing a substantially uniform transparency across the display.

* * * * *